L. F. WHITNEY.
APPARATUS FOR DISTRIBUTING FERTILIZERS, INSECTICIDES, AND FUNGICIDES.
APPLICATION FILED MAY 19, 1920.

1,388,136. Patented Aug. 16, 1921.

Inventor
Leon F. Whitney
By his Attorneys

UNITED STATES PATENT OFFICE.

LEON F. WHITNEY, OF BROOKLYN, NEW YORK, ASSIGNOR TO NATIONAL FARM EQUIPMENT COMPANY INC., OF NEW YORK, N. Y.

APPARATUS FOR DISTRIBUTING FERTILIZERS, INSECTICIDES, AND FUNGICIDES.

1,388,136.   Specification of Letters Patent.   Patented Aug. 16, 1921.

Application filed May 19, 1920. Serial No. 382,473.

*To all whom it may concern:*

Be it known that I, LEON F. WHITNEY, a citizen of the United States, and resident of the borough of Brooklyn, in the city and State of New York, have invented a new and useful Improvement in Apparatus for Distributing Fertilizers, Insecticides, and Fungicides, of which the following is a specification.

The object of my invention is to provide certain improvements in the construction, form and arrangement of the several parts of the device for distributing fertilizers, insecticides and fungicides in liquid or suspended form from cartridges of the material inserted into the device, as will hereinafter appear.

Figure 1:
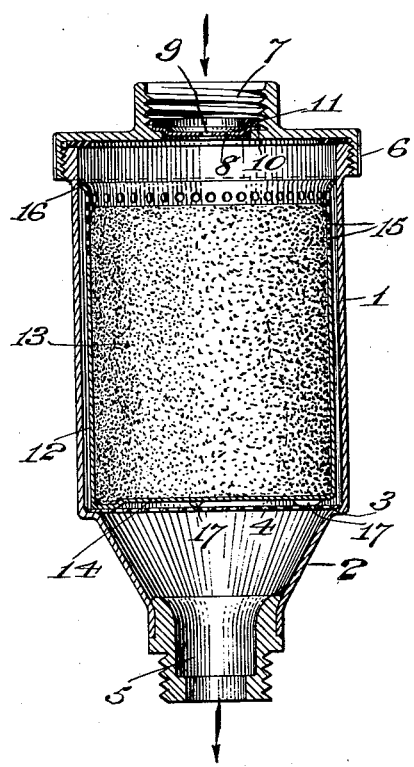

A practical embodiment of my invention is represented in the accompanying drawing, in which, Figure 1 represents the device in longitudinal central section, with a cartridge in position therein.

Figure 2:
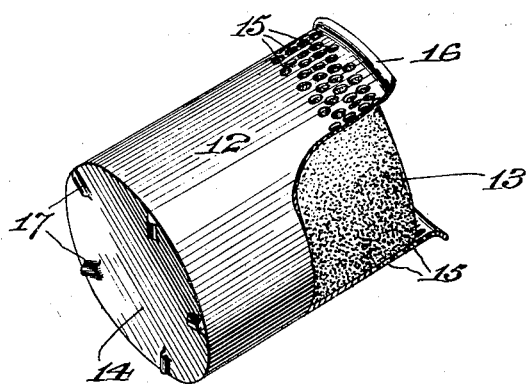

Fig. 2 represents in perspective the cartridge containing cup, a portion of the side walls of the cup being broken away to show the cartridge.

The casing of the device includes a cylindrical body portion 1 and a funnel shaped outlet portion 2 forming between them an inner annular shoulder 3 on which rests and is secured a perforated plate 4. The chamber in the funnel shaped outlet portion 2 of the casing terminates in a suitable outlet passage 5. A nozzle or hose (not shown herein) may be attached to the casing at its outlet end in any well known or approved manner. A cover 6 is removably secured to the inlet end of the body portion 1 of the casing, which cover has a centrally arranged inlet passage 7. A hose or other means of water supply (not shown herein) may be attached to the cover 6 for supplying water to the inlet passage 7. The water flowing from the inlet 7 into the casing may be more or less restricted by a disk 8 having an aperture 9 of the desired size, which disk is seated on a suitable inner annular shoulder 10 and held in place by a gasket 11. A cartridge containing cup 12 is removably positioned within the cylindrical body portion 1 of the casing, which cup the cartridge 13 of the material to be used is adapted to snugly fit so as to leave substantially no space between the cartridge and the side walls of the cup. The bottom 14 of the cup is imperforate, as are the sides up to a point adjacent to the mouth of the cup where the sides are provided with an annular series of perforations 15, to permit the passage of the impregnated water therethrough into the space between the side walls of the cup and the casing.

The side walls of the cup are spaced from the casing by providing the mouth of the cup with an outwardly flaring flange 16, which flange is preferably imperforate. The bottom 14 of the cup is spaced from the perforated plate 4 upon which it rests by providing the bottom of the cup with a plurality of lugs 17 struck outwardly therefrom. This gives ample space for the passage of the impregnated water from the space around the cup through the perforated plate 4 into the space in the funnel shaped portion 2 and from thence through the outlet passage 5.

It will be seen that the inflowing water which is caused to directly impinge upon the top of the cartridge, which snugly fits within the cup 12 will escape through the perforations 15, thus insuring the thorough impregnation of the water before it is allowed to escape, whether the cartridge be more or less consumed.

It is evident that various changes may be resorted to in the construction, form and arrangement of the several parts without departing from the spirit and scope of my invention; hence I do not wish to limit myself strictly to the embodiment herein shown, but—

What I claim is:—

1. In a device of the character described, a casing having water inlet and outlet passages, a perforated plate in the casing and a cartridge containing cup having its side walls spaced from the casing and its bottom supported by and spaced from the perforated plate, said cup having its bottom imperforate and its side walls imperforate up to a point adjacent its mouth where the side walls are perforated to permit the passage of the impregnated water from the cup into the space between the cup and casing.

2. In a device of the character described, a casing having water inlet and outlet passages, a perforated plate in the casing and a removable cartridge containing cup having its side walls spaced from the casing and its bottom supported by and spaced from the perforated plate, said cup having its bottom imperforate and its side walls imperforate up to a point adjacent its mouth where the side walls are perforated to permit the passage of the impregnated water from the cup into the space between the cup and casing.

3. In a device of the character described, a casing having water inlet and outlet passages, a perforated plate in the casing, and a cartridge containing cup having lugs for supporting the cup and spacing its bottom from the said plate and having an outwardly extending flange at its mouth for spacing the side walls of the cup from the casing, said cup having its bottom imperforate and its side walls imperforate up to a point adjacent its mouth where the side walls are perforated to permit the passage of the impregnated water from the cup into the space between the cup and casing.

In testimony, that I claim the foregoing as my invention, I have signed my name this 29th day of April 1920.

LEON F. WHITNEY.